United States Patent [19]
Lehureau et al.

[11] 4,079,248
[45] Mar. 14, 1978

[54] OPTICAL FOCUSSING SENSOR

[75] Inventors: Jean-Claude Lehureau; Claude Bricot, both of Paris, France

[73] Assignee: Thomson-Brandt, Paris, France

[21] Appl. No.: 726,473

[22] Filed: Sep. 24, 1976

[30] Foreign Application Priority Data

Sep. 29, 1975    France ................... 75 29705

[51] Int. Cl.$^2$ ............................................ G01J 1/20
[52] U.S. Cl. .......................................... 250/201; 250/204
[58] Field of Search ............. 250/201, 204, 570, 216, 250/209; 354/25; 356/125, 126

[56] References Cited
U.S. PATENT DOCUMENTS

| 3,418,477 | 12/1968 | Knutrud et al. ............... 250/201 |
| 3,876,841 | 4/1975 | Kramer et al. ............... 250/201 |
| 3,904,870 | 9/1975 | Stauffer ............... 356/125 |
| 3,992,575 | 11/1976 | Velzel et al. ............... 250/201 |

*Primary Examiner*—David C. Nelms
*Attorney, Agent, or Firm*—Cushman, Darby & Cushman

[57] ABSTRACT

The invention relates to focussing sensors for measuring the deviation between the point of convergence of a beam of radiant energy and the surface of an object receiving this beam. According to the invention, a degree of asymmetry is first introduced into this beam, after which the image of this convergence point if formed on photoelectric sensors enabling the distortions of this image to be measured. These sensors supply signals which are dependent upon said deviation and enable it to be measured.

6 Claims, 5 Drawing Figures

OPTICAL FOCUSSING SENSOR

This invention relates to optical focussing sensors by which it is possible to measure the focussing deviation of a beam of radiant energy of which the point of convergence has to be kept in coincidence with the surface of an object which it is desired to illuminate by a spot. An optical sensor of this type may be used in the production of an optical reader intended to read for example the video information recorded in the form of lines of variable length and spacing forming a track on the surface of a support such as a disc.

On account of the high density of information thus recorded, the elements characteristic of the information are extremely small and, in addition, it is necessary for the support to be moved past the reading head, which comprises a projection lens, at high speed. The focussing precision of this lens has to be extremely high to obtain a reading spot of sufficiently small dimensions to be able to resolve these characteristic elements. Now, the instability in the movement of the support, in particular along the axis of the convergent reading beam which defines the reading spot, exceeds the limits of this precision to a considerable extent. Accordingly, it is necessary to use elements for controlling the position of the convergence point which enable fine coincidence to be obtained in spite of this instability. In particular, a focussing control loop is used for keeping intact the sharpness of the reading spot.

It is known that the error signal required for the operation of the focussing control loop can be obtained by using an auxiliary light beam which, on emerging from the projection lens, forms an inclined parallel beam of which the position, after reflection at the support, followed by another passage through the lens, is detected by photoelectric cells which supply said error signal.

It is also known (French Pat. No. 74 01283) to use a stigmatic cylindrical lens which gives a reading beam of which the spot on the support is only substantially circular at the exact focussing point. Beyond this point, the spot has an elliptical shape of which the extension increases with the distance from the focussing spot and of which the orientation is different according to whether the support is situated in front of or behind the circular focussing point. A photoelectric cell with four quadrants enables the change in the shape of the reading spot to be detected and supplies a corresponding electrical signal.

Although these solutions function correctly, they require auxiliary means of which the cost is appreciable and their adjustment fairly delicate.

In accordance with the present invention, it is provided an optical focussing sensor for measuring the deviations between a reflecting surface and the focussing point of an incident beam formed with coherent light rays, said sensor comprising:
a projection lens for focussing said incident beam at said focussing point nearly said reflecting surface, and focussing in an image point the reflected beam delivered from said incident beam by said reflecting surface;
means for introducing an asymmetry into the spatial distribution of said rays at any point of their path which is not situated at a convergence point; and photoelectric means for intercepting said reflected beam, measuring said asymmetry, and delivering an error signal; said photoelectric means being located at a point where is located said image point when said focussing point is located onto said reflecting surface, whereby said error signal is null when said deviation is null.

For a better understanding of the invention, and to show how the same may be carried into effect, reference will be made to the ensuing description and to the attached figures among which:

Figure 1:
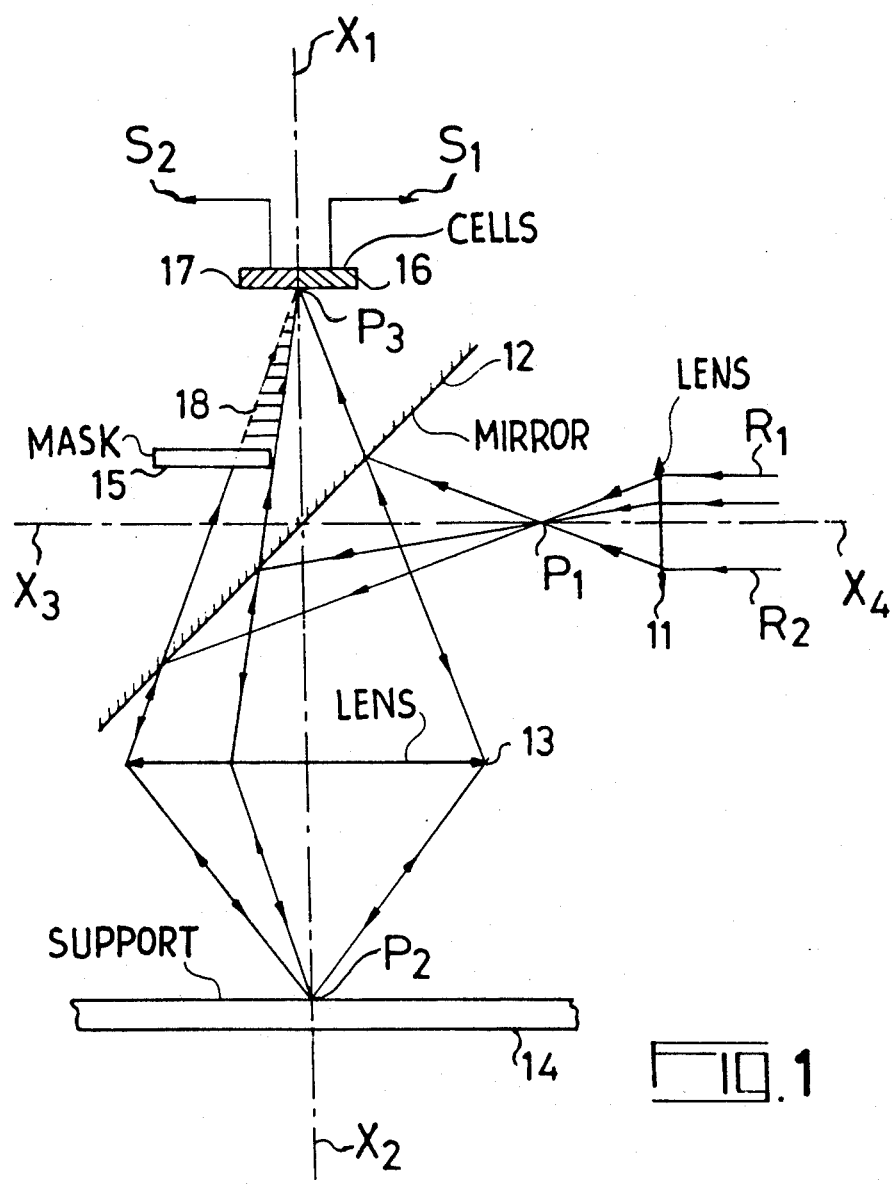
FIG. 1 illustrates a diagrammatic view in section of a reading device comprising a sensor according to the invention.

The reading device comprising a sensor according to the invention, which is diagrammatically illustrated in FIG. 1, is shown in section along a plane defined by the principal optical axis $X_1X_2$ of the device and a secondary optical axis $X_3X_4$ parallel to the direction of the velocity vector of the read point $P_2$ on the support 14, this support being perpendicular to the axis $X_1X_2$. This device comprises a convergence lens 11, a semireflecting mirror 12, a lens 13, a mask 15 and two photoelectric cells 16 and 17.

In the interests of simplicity, the description is confined to the case where the device and the phenomena arising out of it are symmetrical in relation to the sectional plane $X_1X_2/X_3X_4$, which means that the tracking error is zero.

The device receives a parallel light beam of circular cross-section, with an axis $X_3X_4$, defined in the sectional plane by the end rays $R_1$ and $R_2$. This beam is emitted for example by a laser. It is focussed by the convergence lens 11 at a point $P_1$ which acts as light source for the remainder of the device.

From this point $P_1$, the beam continues in the form of a divergent beam which is reflected by the semitransparent mirror 12 positioned perpendicularly of the sectional plane and forming an angle of 45° with the axis $X_1X_2$ and with the axis $X_3X_4$.

The lens 13 then focusses this incident beam upon the surface of the recording support 14 at the point $P_2$ which is thus the image of the point $P_1$ formed by the optical system consisting of the mirror 12 and the lens 13.

The surface of the support 14 is reflecting and returns the light beam towards the lens 13. However, the amount of light returned and its spatial distribution are dependent upon the shape of the lines which represent the recorded information.

The reading light beam reflected by the support is thus taken up by the lens 13 and then focused through the semitransparent mirror 12 at a point $P_3$ which, like the points $P_1$ and $P_2$, is of necessity a spot of finite dimensions. As can be seen by applying the classical rules of geometric optics, this point $P_3$ is symmetrical with $P_1$ relative to the plane of the mirror 12.

Since the point $P_3$ is the image of the point $P_2$ formed by the lens 13, the distribution of energy in the light spot situated at $P_3$ is only dependent upon the distribution of the energy reflected by the different parts of the light spot situated at $P_2$.

This distribution is symmetrical in relation to the sectional plane because the tracking error has been assumed to be zero. It is asymmetrical in the sectional plane about the axis $X_1X_2$ for the high frequencies of the recorded information because, since the points $P_1$ and $P_2$ are spots of finite dimensions, when the length of the lines carrying the information becomes short, correspondings to high frequencies, or when one of the ends of a line passes through the light spot situated at $P_2$, thus corresponding to transients giving high frequencies, the quantity of light reflected varies along this spot in the direction corresponding to the axis $X_3X_4$. For the same reasons, but in reverse order, the distribution of light is symmetrical in the sectional plane about the axis $X_1X_2$ for the low frequencies of the recorded information.

The distribution does not depend upon any degree of asymmetry in the beams when the focussing conditions are observed. In particular, the mask 15 which intersects a portion 18 of the focus reading beam does not therefore introduce any asymmetry into the image situated at $P_3$.

The photoelectric cells 16 and 17 are situated in the vicinity of the image point $P_3$ formed from the point $P_2$ by the lens 13. To this end, they are positioned in a plane normal to the axis $X_1X_2$ and passing through $P_3$ and are situated on either side of a plane perpendicular to the sectional plane and passing through the axis $X_1X_2$. They support signals $S_1$ and $S_2$ which, when filtered by means of a low pass filter, become identical signals because they correspond to a distribution of light which, as we have seen, is symmetrical at low frequency.

When, as a result of instability in the movement of the support 14, the support moves away from (FIG. 2a) or approaches (FIG. 2b) the lens 13, the result obtained above is no longer valid.

However, irrespective of the position of the support 14, the point $P_2$ remains fixed. However, it becomes virtual when the support 14 approaches the lens 13, the real focussing point then being the point $P_4$ which is symmetrical with the point $P_2$ relative to the reflecting surface of the support 14. Accordingly, it is justified, for explaining the phenomena, to use the simplified FIGS. 2a and 2b from which the lens 11 and the mirror 12 have been omitted.

In the case of FIG. 2a, the incident light beam emanating from the point $P_2$ forms on the support 14 a light spot which in the sectional plane is defined by the points $A_1$ and $A_2$. This light beam is reflected at the support 14 and the reading beam thus obtained is focussed by the lens 13 at the point $P_3$. This point $P_3$ is the image formed by the lens 13 of a virtual point $P_5$ which is symmetrical with the point $P_2$ relative to the reflecting surface of the support 14. Since this point $P_5$ is situated further away from the lens 13 than the point $P_2$, the point $P_3$ is closer to the lens 13 than the cells 16 and 17 and the reading light beam, after having converged at $P_3$, then diverges to form on the cells 16 and 17 a light spot defined in the sectional plane by the points $B_1$ and $B_2$. This spot is not the image of the spot $A_1A_2$ because, since it is further away from the lens 13 than the point $P_2$ and closer than the point $P_5$, its image has to be formed between the cells 16 and 17 and the point $P_3$.

FIG. 2a thus clearly shows that a mask such as 15 so inserted as to break the symmetry of the beam relative to the axis $X_1X_2$ in the sectional plane produces an asymmetry of the spot $B_1B_2$, as a result of which the cell 16 receives less light than the cell 17.

Accordingly, the signals $S_1$ and $S_2$ obtained under the same conditions (low-pass filtration) as before are no longer equal, $S_2$ being greater than $S_1$.

In the case of FIG. 2b, the incident light beam which converges towards the virtual point $P_2$ forms on the support 14 a light spot which is defined in the sectional plane by the points $A_1$ and $A_2$. This convergent light beam is reflected by the support 14 and the reading beam thus obtained converges at the point $P_4$ from which it continues in the form of a divergent beam which is then focussed by the lens 13 at the virtual point $P_3$. This point $P_3$ is the image formed by the lens 13 of the point $P_4$. Since this point $P_4$ is closer to the lens 13 than the point $P_2$, the point $P_3$ is further away from the lens 13 than the cells 16 and 17 and the reading light beam is thus intercepted by these cells on which it forms a light spot defined in the sectional plane by the points $B_1$ and $B_2$. This spot is no longer the image of the spot $A_1A_2$ because this image would have to be formed between the cells 16 and 17 and the point $P_3$.

FIG. 2b thus clearly shows that, in such a case, the mask 15 results in the formation of a signal $S_2$ weaker than the signal $S_1$.

Accordingly, the difference between the signals $S_1$ and $S_2$, duly filtered, gives a signal which varies in dependence upon the position of the support 14 relative to the lens 13 and which disappears by changing sign when the support 14 passes through its normal reading position corresponding to the exact convergence of the light beam incident upon the support 14. A signal such as this may be used as an error signal for controlling a focussing servomechanism which, for example, keeps the distance between the support 14 and the lens 13 constant.

The foregoing description has been made with reference to a light beam which is symmetrical in relation to a plane perpendicular to the sectional plane and passing through the axis $X_1X_2$. We shall call this symmetry left-to-right symmetry due to the orientation of the FIG. In order to obtain an error signal, we introduced the mask 15 producing a left-to-right asymmetry of the convergent reading beam situated behind the lens 13 in the path of the light rays by blocking out part of that beam.

It is the left-to-right asymmetry which is required for obtaining this error signal, and it may be obtained by any means, in particular by inserting a mask at any point of the path of the light rays provided that the blocking effect thus obtained it not itself symmetrical. However, this mask cannot be positioned at any point of convergence of the beam passing through the device because, since the asymmetry of the beam does not produce any asymmetry of the images, it follows that any asymmetry in the images does not produce any asymmetry in the beam.

Accordingly, it is paticularly advisable to position this mask in the plane of the pupil of the projection lens because, in this case, it is possible directly to use this pupil as the mask and, since it is generally circular, the required asymmetry may thus be introduced by decentring the illuminating beam. In this case, however, the reasoning based on geometric optics is no longer sufficient.

Figure 3:
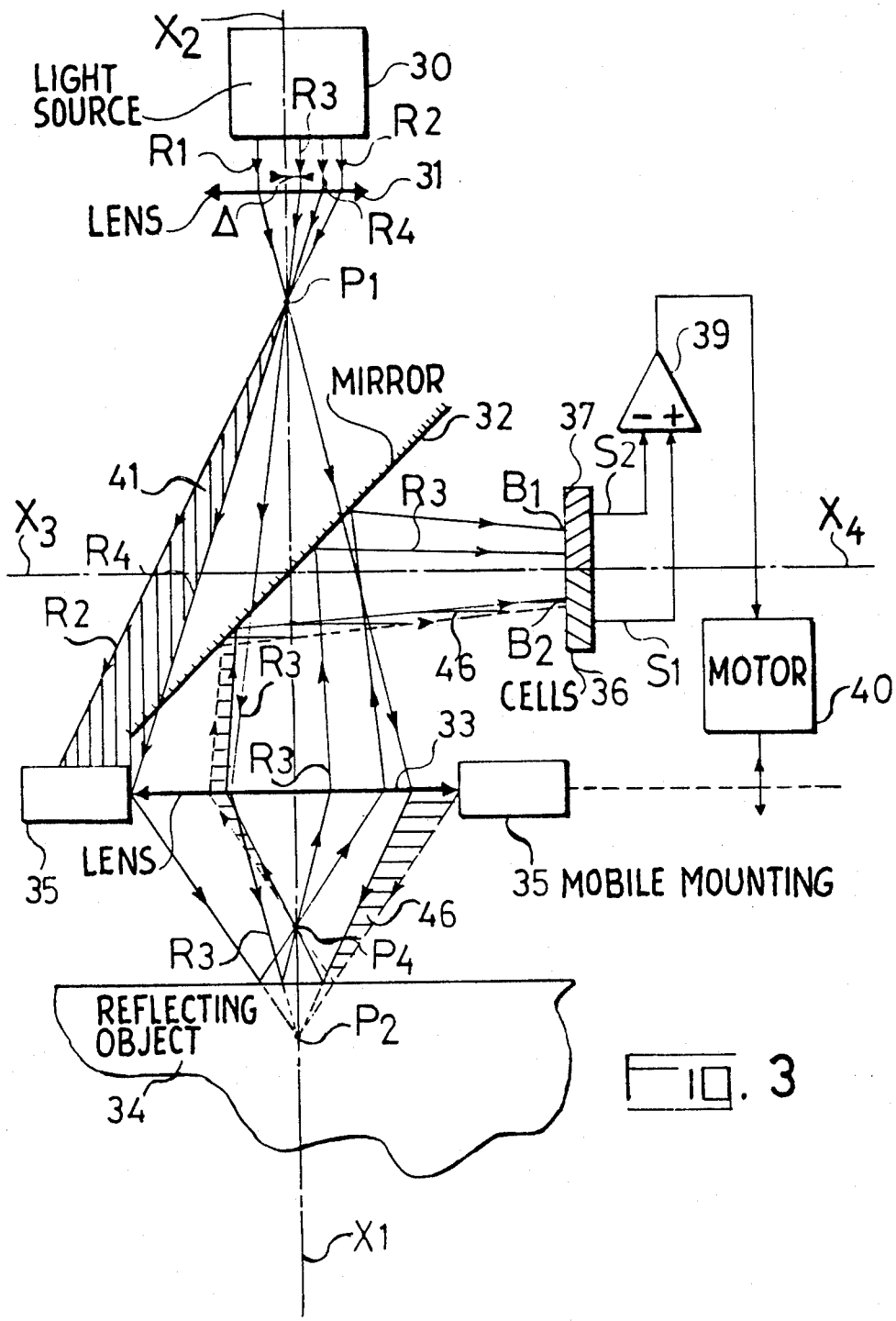
FIG. 3 illustrates a diagrammatic view in section of an other focussing device comprising a sensor according to the invention.

FIG. 3 illustrates a device by which it is possible to focus a light beam on the reflecting surface of an object 34 and which comprises a sensor according to the invention. This device is very similar to that illustrated in FIG. 1, except that the positions of the light source and the photocells have been interchanged in the interests of clarity. This arrangement comprises a light source 30, a convergence lens 31, a semireflecting mirror 32, a projection lens 33 arranged in a mobile mounting 35, two photoelectric cells 36 and 37, a subtractor 39 and a motor 40. It is shown in section along a plane defined by the optical axis $X_1X_2$ of the lens 33 and a secondary axis $X_3X_4$ symmetrical with the axis $X_1X_2$ relative to the plane of the mirror 32.

The light source 30, for example a laser, emits a parallel light beam defined in the sectional plane by the end rays $R_1$ and $R_2$. This beam is circular and cylindrical about an axis represented by the median ray $R_3$ and the distribution of luminuous energy is symmetrical about that ray. The axis of the beam is parallel to the axis $X_1X_2$, but is offset relative to that axis by a distance $\Delta$ so that $R_3$ remains in the sectional plane.

The lens focusses the light beam at a point $P_1$ situated on the axis $X_1X_2$.

From this point $P_1$, the beam continues in the form of a divergent beam, passes through the semitransparent mirror 32 and arrives at the lens 33. Part of the beam, represented by the vertically hatched zone 41 and defined by the rays $R_2$ and $R_4$, is intercepted by the mounting 35 of the lens 33.

The lens 33 then focusses the beam into the virtual point $P_2$ which, as shown in the FIG., is situated below the reflecting surface of the object 34, the FIG. showing the device in a state where the motor 40 have not yet finished bringing the lens 33 back to a position where the point $P_2$ coincides with the surface of the object 34.

After reflecting at the surfaces of the object 34, the beam effectively converges at the real point $P_4$ from which it continues in the form of a divergent beam which is taken up by the lens 33 and emerges from it in the form of a convergent beam which, after reflecting at the mirror 32, coverges towards a point situated on the axis $X_3X_4$ beyond the cells 36 and 37.

Accordingly, the cells 36 and 37 finally intercept the beam before it is focussed again, with the result that a light spot defined in the sectional plane by the points $B_1$ and $B_2$ is formed on the cells.

Figure 2:
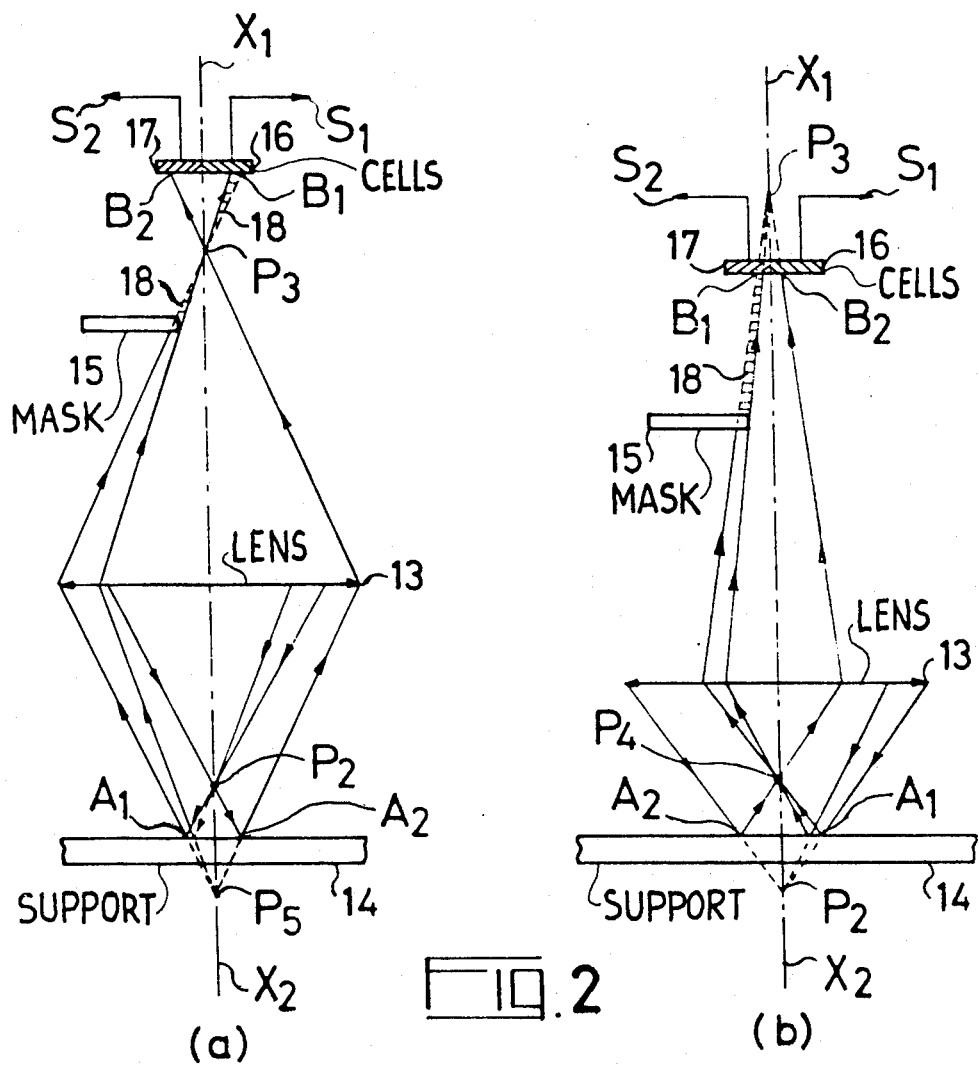
FIGS. 2a and 2b illustrate partcular views of the device shown in FIG. 1.
Figure 4:
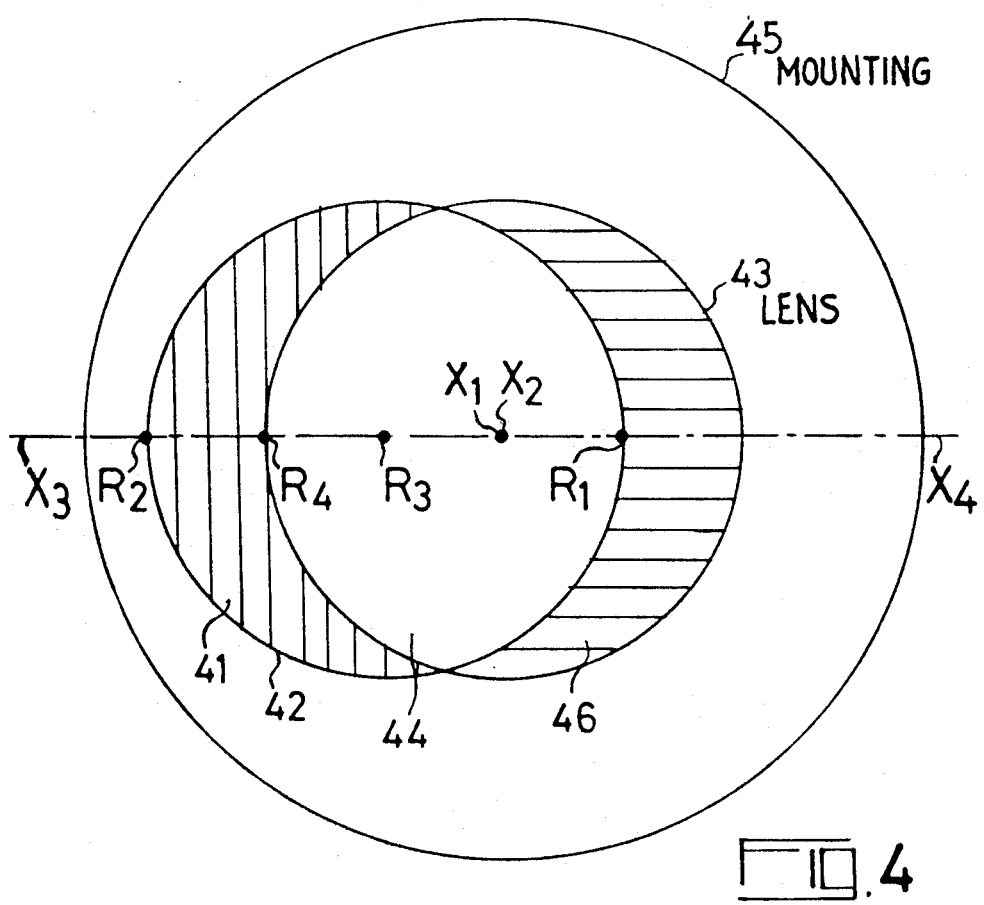
FIG. 4 illustrates a particular view of the device shown in FIG. 3.

In order to determine which of the two cells 36 and 37 is the more illuminated, it is not advisable to a assimilate the zone 41 intercepted by the fitting 39 with the zone 18 blocked out by the mask 15 in FIGS. 1 and 2. This can be seen by referring to FIG. 4 which is a view in section along a plane perpendicular to the axis $X_1X_2$ and situated at the level of the lens 33. The axis $X_3X_4$ is the same as that in FIG. 3, but is projected onto this plane. The circle 43 defines the external contour of the lens 33 and the internal contour of the mounting 35 of which the external contour is defined by the circle 45. The circle 42 defines the cross-section of the light beam incident through the plane of the FIG. whilst the rays $R_1$ to $R_4$ are represented by their trace in that plane.

It can thus be seen that these three circles defines three zones:
- a vertically hatched zone 41 corresponding to that part of the beam which is intercepted by the mounting 45;
- a central zone 44 which corresponds to that part of the beam which passes through the lens 33;
- a horizontally hatched zone 46 which corresponds to that part of the lens which is not illuminated by the beam and which defines a virtual blocked beam 46 in FIG. 3.

The light beam emerging from the lens 33 may thus be presented as emanating from the choice of one of the following three incident light beams:

- the real beam illuminating the zones 41 and 44 blocked out by the real mask 41;
- a virtual beam illuminating the zones 44 and 46 blocked out by the virtual mask 46;
- a virtual beam illuminating the zones 41, 44 and 46 blocked out by the real mask 41 and the virtual mask 46.

None of these constructions enables the most illuminated cell to be determined, although to obtain this indication it is possible to investigate the distribution of luminous energy in the beam emitted by the source 30 and to observe what happens in the path.

In the case of a laser, and likewise in the case of any source producing a parallel, cylindrical circular beam which is not specially corrected, this distribution is symmetrical about the axis of the beam and, in a plne passing through this axis, is substantially represented by a Gaussian centered on $R_3$ and bounded by $R_1$ and $R_2$. Accordingly, a large part of the luminous energy of the beam is concentrated about the median ray $R_3$ and the cell which receives this ray will be the cell which supplies the strongest signal.

Accordingly, by following the progress of this ray in FIG. 3, it can be seen that it impinges on the cell 37 because it would have to cross the axis $X_3X_4$ at the point of convergence of the reflected beam which, as shown in the FIG., is situated behind the cells because it is the image of the point $P_4$ formed by the lens 33 and the mirror 32. In this case, therefore, the signal $S_2$ emitted by the cell 37 is stronger than the signal $S_1$ emitted by the cell 36.

When the focussing point $P_2$ of the incident beam is situated above the surface of the object 34, the point of convergence of the reflected beam is still situated on the axis $X_3X_4$, but on this occasion in front of the cells, and the ray $R_3$ thus cross this axis to impinge on the cell 36 which thus emits a signal $S_1$ which on this occasion is stronger than the signal $S_2$.

The subtractor 39 performs the difference between the signals $S_1$ and $S_2$ and delivers an error signal to the motor 40 which contains proper amplification means and causes the mountiing 35 supporting the lens 33 to advance or move back along the axis $X_1X_2$ until the point $P_2$ is situated exactly on the surface of the object 34. At this moment, the image of $P_2$ is formed exactly on the cells 36 and 37 and the ray $R_3$ impinges on these two cells at a point situated on their connecting line. Thus, the signals $S_1$ and $S_2$ are now equal and their difference disappears when the deviation between the surface of the object 34 and the focussing point $P_2$ disappears.

The focussing arrangement thus formed is simple and does not necessitate any delicate adjustments.

The following documents have been quoted during the French prosecution:
French application No. Fr 2 122 590 (Leitz)
French application No. FR 2 222 666 (Thomson-Brandt).

What we claim is:

1. An optical focussing sensor for measuring the deviations between a reflecting surface and an initial focussing point of an incident beam formed with coherent light rays, said sensor comprising:
   - a projection lens for focussing said incident beam at said initial focussing point nearly said reflecting surface, and focussing in an image point the reflected beam delivered from said incident beam by said reflecting surface;

means introducing an asymmetry into the spatial distribution of said rays at any point of their path which is not situated at a focussing point; and photoelectric means for intercepting said reflected beam, measuring said asymmetry, and delivering an error signal; said photoelectric means being located at a point where is located said image point when said initial focussing point is located onto said reflecting surface, whereby said error signal is null when said deviation is null.

2. A sensor as claimed in claim 1, wherein said means for introducing an asymmetry comprise a mask partially occulting said path.

3. A sensor as claimed in claim 2, wherein said mask is located for partially occulting said reflected beam without occulting said incident beam.

4. A sensor as claimed in claim 2, wherein said mask is the mounting of said projection lens.

5. A sensor as claimed in claim 4, wherein said mounting is circular, said incident beam being dicentered in relation to said mounting.

6. A sensor as claimed in claim 1, wherein said photoelectric means comprise at leasst two cells; said cells being equally illuminated when said deviation is null, the illumination of one of said cells decreasing and the illumination of the other of said cells increasing when said deviation increases in one direction, and the illumination of said other cell decreasing and the illumination of said one cell increasing when said deviation increases in the other direction.

* * * * *